July 27, 1954
B. J. MAYLAND
2,684,895
SYNTHESIS GAS MANUFACTURE
Filed Oct. 7, 1948
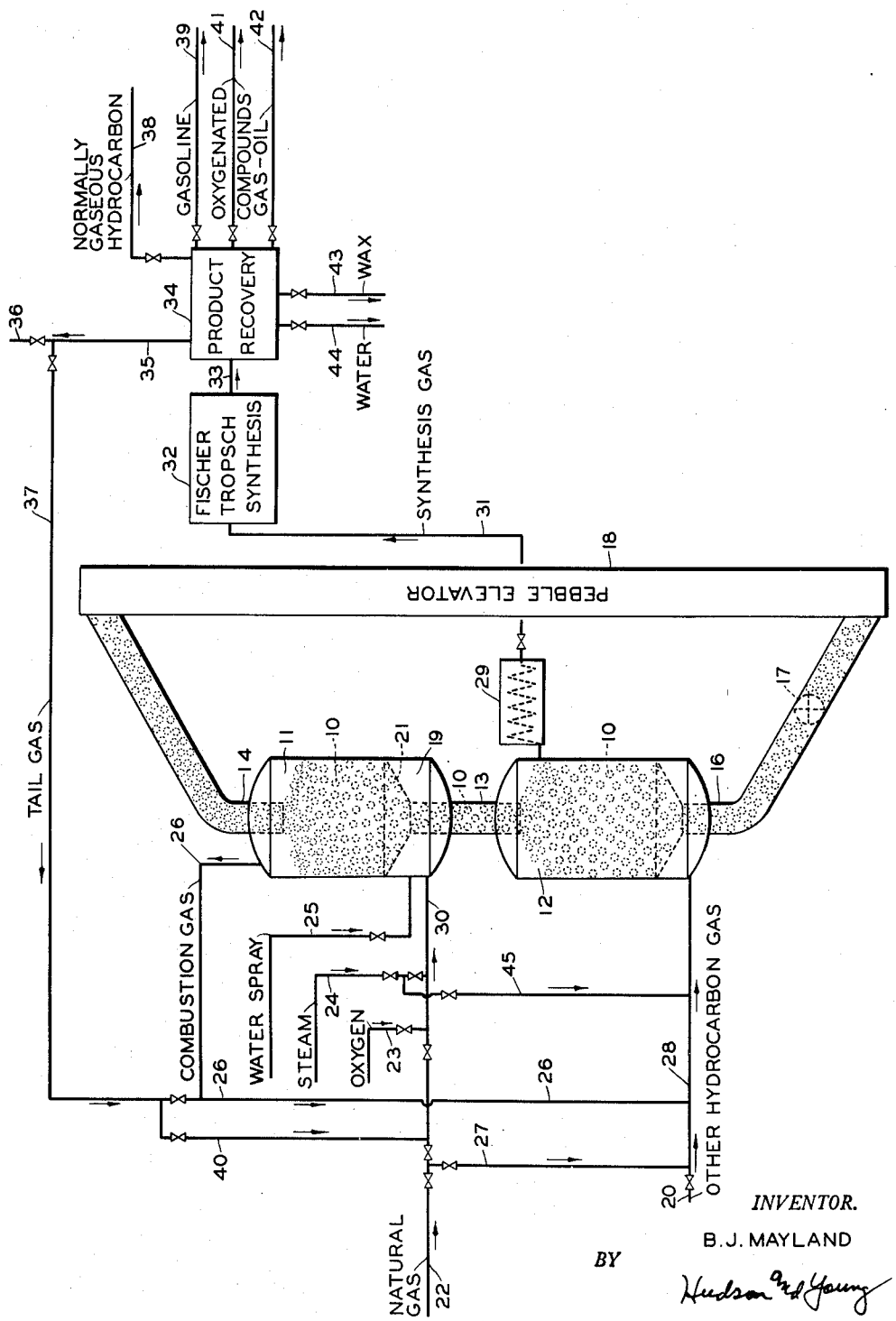
INVENTOR.
B. J. MAYLAND
BY
*Hudson and Young*
ATTORNEYS Patented July 27, 1954

2,684,895

UNITED STATES PATENT OFFICE 2,684,895

SYNTHESIS GAS MANUFACTURE

Bertrand J. Mayland, Bartlesville, Okla., assignor to Phillips Petroleum Company, a corporation of Delaware Application October 7, 1948, Serial No. 53,364

8 Claims. (Cl. 48—196)

This invention relates to the manufacture of synthesis gas. In one aspect this invention relates to the production of hydrocarbons and oxygen derivatives of hydrocarbons. In another aspect this invention relates to the manufacture of carbon monoxide-hydrogen feed stocks suitable for a synthesis step wherein hydrocarbons and oxygen derivatives of hydrocarbons are produced. In another aspect this invention relates to the production of synthesis gas from a hydrocarbon gas, oxygen, steam, and carbon dioxide. In still another aspect, this invention relates to the utilization of pebble heater apparatus in a process for the manufacture of carbon monoxide-hydrogen stocks.

Carbon monoxide-hydrogen mixtures have utility as feed stocks in various synthesis processes. For example, in a process of the Fischer-Tropsch type, carbon monoxide may be reacted with hydrogen in the presence of a promoted iron catalyst to form hydrocarbons and oxygen derivatives of hydrocarbons. In a process of the oxo type, carbon monoxide and hydrogen add to olefin hydrocarbons, usually of high molecular weight, to form aldehydes and alcohols, as the chief product. In a process for the manufacture of methanol, carbon monoxide and hydrogen react to produce methanol as a chief product. In a hydrogen manufacturing process, a hydrogen and carbon monoxide mixture may be contacted with steam in the presence of an iron catalyst to produce hydrogen and carbon dioxide, and the latter scrubbed from the total product to produce hydrogen in high purity and yield. Such processes as the Fischer-Tropsch, oxo, and methanol synthesis, are generally considered to comprise two steps, a "synthesis gas preparation" step and a "synthesis" step.

In the first named step, carbon monoxide and hydrogen is prepared from raw carbon-containing materials such as hydrocarbon, coal, coke, or oil shale by oxidation with an oxidizing gas such as oxygen, steam, or carbon dioxide, either alone or with various combinations of such agents. In some cases, various metal oxides may serve as oxidizing agents. The gas thus produced, i. e., the hydrogen-carbon monoxide product is generally referred to as "synthesis gas" because it may be prepared in suitable yields, and in a suitable mole ratio of hydrogen to carbon monoxide to render it valuable as feed gas for a synthesis step, such as above described; the term "synthesis gas" employed herein refers to such a hydrogen-carbon monoxide mixture.

Hydrocarbon gas can be partially oxidized to hydrogen and carbon monoxide by an oxidizing gas such as already mentioned, either catalytically or thermally. The reaction employing carbon dioxide and/or steam is endothermic whereas the reaction employing oxygen is exothermic. The oxidation of a hydrocarbon, for example, is represented by the following net equations, where methane, representing the hydrocarbon, is oxidized by each of the oxidizing agents, oxygen, steam and carbon dioxide.

(1) $2CH_4 + O_2 = 2CO + 4H_2 + 30,800$ B. t. u.
(2) $CH_4 + H_2O = CO + 3H_2 - 88,700$ B. t. u.
(3) $CH_4 + CO_2 = 2CO + 2H_2 - 106,400$ B. t. u.

Regardless of which oxidizing agent is used, the resulting equilibrium product is a mixture of hydrogen, carbon monoxide, carbon dioxide, and steam, together with any unreacted hydrocarbon.

Two generally well-known methods for producing synthesis gas are, steam-carbon dioxide reforming, and partial oxidation with oxygen. In each case, carbon monoxide and hydrogen may be produced catalytically or non-catalytically in a desired mole ratio to each other, usually from 1.5 to 2.5 although in some cases, such as when preparing synthesis gas for an oxo-type process, approximately a 1:1 mole ratio is required. The steam-carbon dioxide reforming method has the advantage that it does not require expensive feed components. However, the reaction is highly endothermic and expensive equipment is necessary to transfer heat to the reaction zone at the high temperatures required, which are well over 2000° F., often in the range of 2300–2500° F., when operating non-catalytically, and from 1400 to 2000° F. when employing a catalyst. The partial oxidation process employing oxygen as the oxidizing agent, supplemented when desired by limited amounts of carbon dioxide and/or steam, has the advantage that the reaction is exothermic and thereby thermally self-sufficient, and requires equipment less expensive than that of the reforming process.

Of these two well-known routes for synthesis gas manufacture, the latter named process, i. e., the thermally self-sufficient reaction, is looked upon by those skilled in the art as offering specific and definite advantages over the older reforming methods, as regards commercial scale application.

In the partial oxidation process employing methane-rich stocks, such as natural gas or natural gas stripped of at least a portion of its heavier components, a number of difficulties are encountered. In the first place, due to the high temperatures developed in the exothermic reaction, as indicated by Equation 1, some carbon formation occurs as a result of thermal decomposition of the hydrocarbon reactant. The tendency for such carbon formation is encouraged by the reducing nature of the atmosphere, i. e., the presence of carbon monoxide and hydrogen at such high temperatures. Carbon thus formed, deposits throughout the system, which is especially disadvantageous as regards operation with a catalyst, since carbon deposits accumulate on the catalyst to gradually decrease its activity and to finally render it inactive. Furthermore, carbon formation takes place at the expense of hydrocarbon gas feed and thereby is responsible for inefficient utilization of the hydrocarbon feed stock. In the second place, when utilizing the partial oxidation route, the carbon dioxide in the product will be excessively high unless the synthesis gas product is held at the reaction temperature until it leaves the zone of reaction. This is true, due to the fact that equilibrium reaction mixture is determined by the water gas shift reaction, $H_2+CO_2 \rightleftarrows CO+H_2O$, which tends to shift to the right with rising temperatures, and to the left with decreasing temperatures. In order to reduce the carbon dioxide concentration in the product, and thus increase the utilization of the hydrocarbon feed, products should, therefore, be retained at the highest reaction temperature until they leave the reaction zone. It is then necessary to quench the effluent product gas in order to quickly reduce the temperature to a level at which the water gas shift reaction is ineffective, usually below 1000° F.

This invention is concerned with a process for the manufacture of synthesis gas from hydrocarbon gas by oxidation with oxygen, carbon dioxide and steam, wherein such carbon depositions as those above discussed do not occur, and wherein products leaving the reaction zone are maintained at a high temperature level and thereafter rapidly quenched, so as to minimize the formation of excessive amounts of carbon dioxide in the reaction, and thus increase the degree to which the hydrocarbon feed gas is utilized; and this invention is also concerned with effecting an improved efficiency in the utilization of oxygen-hydrocarbon feed stock, and of heat in such a manufacturing process.

An object of this invention is to provide a process for the manufacture of a carbon monoxide-hydrogen stock.

Another object is to provide a process for the manufacture of hydrocarbons and oxygen derivatives of hydrocarbons.

Another object is to provide a method for the manufacture of synthesis gas wherein oxygen is one of the oxidizing gases, and the concomitant formation and deposition of carbon in the zone of carbon monoxide and hydrogen formation is prevented.

It is still another object of this invention to provide a means for the manufacture of synthesis gas wherein excessive carbon dioxide concentrations in the synthesis gas product are prevented.

It is still another object to utilize pebble heater apparatus in the preparation of synthesis gas.

Other objects will be apparent, to one skilled in the art, in view of the accompanying discussion and disclosure.

In accordance with a preferred embodiment of my invention, a carbon monoxide-hydrogen feed stock is produced, which may be utilized as feed to a synthesis step of a process of the Fischer-Tropsch type, or for such other applications as those named hereinabove. A hydrocarbon gas-oxygen mixture is burned and resulting hot combustion, or flue, gas is passed in direct heat exchange with a moving relatively cool contact mass under temperature and flow conditions regulated to insure heating the mass to a temperature substantially above a predetermined level required for a steam-carbon dioxide reforming of an additional portion of the hydrocarbon gas, or another hydrocarbon gas, described hereinbelow. Resulting hot combustion gas comprises carbon dioxide and steam when the hydrocarbon is burned with at least a stoichiometric proportion of oxygen required for complete combustion, and when less than such a stoichiometric proportion of oxygen is employed, the hot combustion gas comprises carbon dioxide, hydrogen, steam and carbon monoxide. Subsequent to the heat exchange step, resulting combustion gas is admixed with additional hydrocarbon gas and the resulting admixture passed through a second zone in direct heat exchange with the moving heated contact mass whereby the hydrocarbon is reformed by steam and carbon dioxide to produce synthesis gas. Any hydrogen and carbon monoxide present in the admixture entering the second zone is recovered in the synthesis gas product.

This step of my invention is carried out in a pebble heater type apparatus which, in a preferred embodiment of my invention, usually comprises a series of substantially, vertically extending zones, often in vertical alignment with each other. Usually, two such zones are employed and are connected by a relatively narrow interconnecting zone or throat. The top or upper zone is commonly referred to as the pebble heating chamber and the lower zone as the gas reaction chamber. A combustion zone, or chamber, is positioned adjacent or in close proximity to the sides of the lower portion of the heating chamber. Combustion gas from the combustion chamber is passed through the mass of pebbles in the pebble heating chamber. A contiguous mass of particulate contacting material, often referred to as pebbles, fills the pebble heating zone, the interconnecting zone or throat, and the gas reaction zone and flows downwardly through these three zones by force of gravity. Pebbles are discharged from the bottom of the gas reaction zone at a controlled rate, and returned, usually by elevating means, to the inlet in the upper portion of the pebble heating zone. A contiguous moving pebble mass thereby fills the heating zone, reaction zone and the interconnecting zone at all times.

In accordance with the practice of a preferred embodiment of this invention, a portion of a hydrocarbon gas to be converted to synthesis gas is admixed with oxygen and/or air or any suitable oxygen-containing gas, and the resulting admixture is burned in a combustion zone of a pebble heater apparatus. The combustion is controlled to prevent the formation and precipitation of any elemental carbon, even though high temperatures are developed. Hot combustion product is passed upwardly through the pebble heating zone in direct heat exchange with pebbles therein. Pebbles thus heated pass downwardly through the pebble throat into the gas reaction chamber. Hot combustion gas may comprise carbon dioxide and steam alone, or together with carbon monoxide and hydrogen, and subsequent to the above described heat exchange step, is admixed with the remaining portion of gaseous hydrocarbon feed, or with another hydrocarbon gas, if desired, and the resulting admixture passed through the reaction zone in contact with hot pebbles whereby synthesis gas is formed by the endothermic reaction of steam and carbon dioxide with hydrocarbon. Synthesis gas product is passed from the reaction zone and quickly quenched, and the effluent synthesis gas product recovered.

It is usually preferred to supply additional steam to the reactant gases entering the reaction zone when it is desired to produce synthesis gas containing hydrogen to carbon monoxide in a mole ratio above that otherwise obtained, since steam, as compared with carbon dioxide, reacts with the hydrocarbon to form a disproportionately increased amount of hydrogen and thereby to "adjust" the mole ratio of hydrogen to carbon monoxide in the synthesis gas product to an increased level. Supplementary steam is advantageously added with the hydrocarbon-oxygen mixture introduced to the combustion zone, whereby it not only reaches the gas reaction zone along with effluent combustion gases, but it also serves to control the flame temperature to within a predetermined limit by its absorption of sensible heat. The temperature of the pebble mass in the reaction zone is dependent upon variables such as pebble flow, mole ratio of oxygen to hydrocarbon in the combustion mixture, and the amount of steam added to the combustion zone. If it is desired to forego steam addition, control of pebble temperature is effected by regulation of the remaining above named variables. If desired, steam may be added at a point intermediate the above described heat exchange step and the gas reaction zone.

The reactions taking place in my process are exemplified by the equations above, (1), (2), (3) and by Equation 4 below, (4) $CH_4 + 2O_2 = CO_2 + 2H_2O + 345{,}000$ B. t. u.

As demonstrated by these equations, exothermic heat provided in the pebble heating chamber is the source of endothermic heat required for the reaction progressing in the lower chamber, which is referred to herein as steam-carbon dioxide reforming of the hydrocarbon.

Any gaseous hydrocarbon or gaseous hydrocarbon mixture can be converted to synthesis gas in accordance with my process by the proper selection of operating conditions, especially the mole ratio of oxygen to hydrocarbon gas in the mixture burned in the combustion zone. In any case, a combustion mixture is employed which when burned does not produce carbon as a product and which burns at a sufficiently high temperature to effect the requisite heat transfer in the pebble heating chamber. Other process conditions may be varied accordingly, dependent upon the specific hydrocarbon stock converted.

The term "pebble" as used throughout this specification denotes any refractory material in fluid form, size, and strength, which will flow readily by gravity through the various chambers of a pebble heater apparatus. Pebbles are preferably, substantially spherical and are about 1/8" to 1" in diameter, with the preferred range from 1/4" to 1/2".

The invention utilizes pebbles such as alumina, beryllia, zirconia, mullite and periclase, and the like, either alone or impregnated with a material catalytic to the reforming step of my process, such as nickel or iron or their oxides. The reforming step may be operated either catalytically or non-catalytically, the latter method requiring temperatures within the range of 500 to 1000° F. above those required for catalytic operation.

When operating my process non-catalytically, I prefer to use highly refractory pebbles, such as those made of alumina or mullite, and when employing a catalyst, I may employ alumina or mullite or any of various other pebbles highly resistant to heat, impregnated with a catalytic material. Pebbles impregnated either with nickel or nickel oxide are preferred catalytic materials for my process. Such a catalytic pebble may be prepared by any well-known dipping method wherein the pebble absorbs nickel nitrate on its surfaces, which upon being heat treated is converted to nickel oxide. Another well-known procedure for preparing such a catalytic pebble comprises spraying nickel nitrate onto the surface of a hot pebble and concomitantly effecting decomposition of the nitrate to the oxide.

With reference to the figure and following description, a preferred embodiment of my invention will be specifically disclosed. It is understood, however, that the figure is a diagrammatic illustration of one form of apparatus in which my process may be practiced, and may be altered in many respects by those skilled in the art and still remain within the intended scope of my invention, and that while the description is representative in general of my process, minor variations and departures may be necessary in adapting my process to the various conditions within the scope of my invention.

Referring to the figure, pebble heating zone 11 and gas reaction zone 12 are well insulated chambers, each containing a fluent mass of pebbles 10, impregnated with nickel oxide, and connected by a heat insulated conduit forming pebble throat 13. Conduits 14 and 16 serve as pebble inlet and outlet for chambers 11 and 12 respectively. Star valve (or other type of pebble feeder) 17 regulates the rate of flow of pebble mass through chamber 11, throat 13 and chamber 12 and feeds pebbles flowing from the bottom of chamber 12 into bucket elevator 18 for delivery to pebble inlet 14 and on into chamber 11. Combustion chamber 19 is positioned subjacent pebble heating chamber 11. Chambers 19 and 11 are separated by perforate support 21 through which combustion gas, formed in chamber 19, ascends to pass in direct heat exchange with pebble mass 10 in chamber 11. A natural gas, containing at least 80 per cent methane, is introduced through line 22 and a portion thereof, usually from about 75 to about 90 per cent is admixed with oxygen from line 23 in an oxygen to natural gas volume ratio within the limits of 0.8:1 to 0.9:1, and with steam from line 24 in an amount to adjust the mole ratio of hydrogen to carbon monoxide in the final synthesis gas product to a pre-determined level, usually about 2:1, which is above that ordinarily obtained. Usually an amount of 200° F. superheated steam within the range from about 0.2 to 0.5 volume per total volume natural gas being reacted, is utilized. In those cases wherein the amount of steam required for adjusting the hydrogen to carbon monoxide mole ratio in the synthesis gas product is lower than that amount required for adequately reducing the flame temperature, liquid water may be advantageously added, instead of steam, since the cooling effect of liquid water herein is approximately double that of 200° F. superheated steam. Liquid water may be sprayed into combustion chamber 19 through line 25. When desired, both steam and liquid water may be introduced into combustion zone 19 through lines 24 and 25. The resulting hydrocarbon-oxygen-steam admixture is introduced through line 30 to combustion zone 19 and burned therein to form hot combustion gas comprising carbon dioxide, hydrogen, steam and carbon monoxide. Hot combustion gas formed in zone 19 together with any steam introduced to the combustion chamber ascends through perforate wall 21 at a temperature in the range of about 2200° to 2500° F. and passes upwardly through chamber 11 in direct heat exchange relation with pebble mass 10. The temperature of pebbles leaving zone 11, i. e., entering throat 13, is from about 1800° to 2200° F., and may be controlled to higher or lower levels by regulating the pebble flow, by means of star valve 17, mentioned above. Combustion gas, having imparted heat to pebbles in zone 11 emerges as effluent from zone 11 through line 26 at a temperature usually about 100° F. above that of the incoming pebbles. Usually, I prefer to operate at a pebble inlet temperature within the range of 500 to 1100° F., more often about 600 to 800° F. Effluent combustion gas from zone 11 containing added steam as already described, is passed through line 26 and admixed in line 28 with the remaining portion of natural gas to be reacted, introduced from lines 22 and 27. The resulting natural gas-steam-carbon dioxide-carbon monoxide-hydrogen admixture is introduced from line 28 into the lower portion of zone 12 and therein converted to synthesis gas by passing in countercurrent flow to the downwardly moving mass of pebbles previously heated in pebble heating zone 11, which furnishes the sensible heat, and the endothermic heat of reaction, necessary for the reforming reaction. Any hydrogen and carbon monoxide present in the admixture passing through line 28, is recovered as synthesis gas product in a subsequent step.

When desired, steam required for the reforming step may be added from line 24 directly to zone 12 through lines 45 and 28.

Synthesis gas product is retained at the reaction temperature until it leaves the pebble mass in the reaction zone and thereafter is quickly quenched to a temperature below about 1000° F., in heat exchange means 29, usually a waste heat boiler. Effluent synthesis gas product containing hydrogen to carbon monoxide in a mole ratio of about 2:1 is passed from heat exchanger 29 through line 31 as feed to a synthesis step 32 of a process of the Fischer-Tropsch type wherein it may be converted to hydrocarbons and oxygen derivatives of hydrocarbons in the presence of a promoted iron catalyst, usually of the fluid type, at a temperature within the limits of 560 to 620° F., at a pressure within the range of 5 to 30 atmospheres, and at a space velocity (fluidized catalyst operation) within the limits of 1500 to 3500 standard gas volumes per catalyst volume per hour. Total effluent from zone 32 is passed through line 33 to product separation means 34 which comprises coolers, separators, distillation equipment, storage tanks and the like not individually illustrated, which can be used to effect a separation of various selected product fractions. Tail gas product which may comprise as high as 40 per cent hydrogen, 3 to 5 per cent carbon monoxide, from 5 to 15 carbon dioxide and the remainder methane, is passed from zone 34 through lines 35 and 36 to further utilization means, not shown. However, if desired, tail gas from line 35 may be passed through line 37 in any desired proportion for admixture with materials from line 26, whereby it enters reaction zone 12 along with materials in line 28 already described. Tail gas may thus be utilized in view of its methane and carbon dioxide content. When tail gas is utilized, in this manner, it is necessary to regulate the amount of natural gas from line 27 and the amount of $H_2O$ from lines 24 and/or 25 to conform with the amount of methane and carbon dioxide that will reach reaction zone 12 from line 37 in order to completely utilize all reactants in the formation of the desired synthesis gas product. For example, if the tail gas has a high methane content and a low carbon dioxide content, the amount of natural gas from line 27 will necessarily be decreased. Furthermore, utilization of tail gas will require in most instances additional supplementary steam from lines 24 and/or 25 for adjusting the mole ratio of hydrogen to carbon monoxide in the final synthesis gas product.

Tail gas from line 37 may be passed in any desired proportion for burning in combustion zone 19 through lines 40 and 39, and therefore divided, when desired, between zones 19 and 12, or it may be directed entirely to either zone 19 or zone 12.

From separation zone 34 are withdrawn a normally gaseous fraction through line 38, a gasoline fraction through line 39, a fraction of oxygen-containing materials through line 41, a gas oil fraction through line 42, wax and wax-like product through line 43, and by-product water through line 44.

As already stated, pebble temperatures in the heating zone are controlled among other means, by regulating the mole ratio of oxygen to natural gas in the combustion mixture. This variable is very easily controlled and can be employed at as high a value as desired, the upper limit usually being set by the resistance of the combustion equipment to failure at such resulting high temperatures. For example, if an oxygen to natural gas ratio affording complete combustion is employed, a flame temperature of 3000 to 4000° F. will be developed and resistance of many types of refractory materials in such a combustion system, to such high temperatures, may be relatively short lived. However, it is within the scope of my invention to completely burn the hydrocarbon material in the combustion zone to form carbon dioxide and steam in accordance with Equation 4 above. When combustion is complete, steam and/or water addition to the combustion chamber is especially advantageous in view of its cooling effect to provide for a lower overall combustion temperature. For example, when adding 0.2 volumes of steam per total volume of hydrocarbon being converted the flame temperature may be reduced by roughly from 8 to 10 per cent and by adding liquid water in place of steam the cooling effect is substantially doubled, as already mentioned. Consequently, my process can be operated while effecting complete combustion in the top chamber at a significantly reduced flame temperature.

I have found, however, that lower oxygen to hydrocarbon mole ratios may be employed with concomitant formation of carbon dioxide, hydrogen, carbon monoxide and steam, with no formation and deposition of carbon taking place. The use of such lowered oxygen to hydrocarbon mole ratios is especially advantageous both from the standpoint of conserving oxygen, and the longer life of the combustion equipment at the lower prevailing temperatures. I have found, for example, that when employing natural gas containing at least 80 per cent methane, I may limit the oxygen to natural gas overall volume ratio to within the limits of 0.7:1 to 0.9:1. When employing methane, an oxygen to methane overall mole ratio usually not higher than from 0.6:1 to 0.7:1 may be employed.

In the reforming step in the lower zone, enough carbon dioxide must be present at equilibrium so that carbon deposition will not occur therein. Therefore, a minimum concentration of carbon dioxide in the synthesis gas product is desirable. These minimum concentrations in my process are usually within the limits of from 1 to 1.5 mole per cent. Concentrations of carbon dioxide above these values are excessive and are prevented in the practice of my invention. Such excessive carbon dioxide concentrations are concomitant with a lowered efficiency of utilization of a natural gas feed stock, and result from the effect of the water gas shift reaction discussed earlier in this specification, which is especially manifest when product gases leave the catalyst or reaction zone at decreasing temperatures, in the region of which, the equilibrium to the left is relatively rapid, especially since the system often contains materials catalytic to the shift. My invention provides for minimizing this effect, since the pebbles at the product gas outlet of the reaction zone are at a temperature equal to or above that in any other part of the zone; therefore, at the point of exit of the synthesis product gas, the water gas shift is inclined to the extreme right, and excessive carbon dioxide concentrations in the effluent product are prevented. The quick quench step is then utilized to rapidly absorb the heat from the effluent product gas and to reduce the temperature to a value below that at which the water gas shift is effective, usually a temperature from 900 to 1200° F., preferably below 1000° F.

Air may be used as the oxidizing gas solely, or in admixture with supplemental oxygen. When employing air as the oxidizing gas, nitrogen is introduced to the lower zone whereby nitrogen diluent is present in the synthesis gas, which is sometimes undesirable from the standpoint of subsequent utilization of the synthesis gas as feed in a process of the various types described earlier in this specification. Synthesis gas containing excessive amounts of nitrogen, such as would occur when using air as the oxidizing gas usually require higher operating pressures (when used in a process of the Fischer-Tropsch type) and larger scale equipment to handle the bulk of extra nitrogen "riding" through such a synthesis system.

In the utilization of pebble heater apparatus it may be desirable to effect the combustion ordinarily taking place in zone 19, in a zone external to the pebble heater apparatus whereby hot gases would be produced separately and introduced to chamber 11 through, for example, lines 22 and 30. It might be preferable to conduct the combustion in chamber 11 without the benefit of chamber 19. In such operation, the space occupied by zone 19 in the figure could be completely filled with pebbles.

My invention is not limited to the use of the same hydrocarbon gas in both chambers. On the contrary, two separate hydrocarbon gas stocks may be employed. For example, a refinery gas of acceptable heat content may be utilized in the top chamber to produce carbon dioxide and steam together with any carbon monoxide and hydrogen, and a gas stock of relatively high methane content may be utilized in the lower chamber. In such practice, a hydrocarbon gas may be introduced to chamber 19, as already described, and the other hydrocarbon gas introduced to chamber 12 through lines 20 and 28.

For convenience and clarity certain apparatus such as pumps, storage tanks, etc. have not been shown in the drawing. Obviously such modifications of the present invention may be practiced without departing from the scope of the invention.

Advantages of this invention are illustrated by the following examples. The reactants and their proportions and other specific ingredients are presented as being typical and should not be construed to limit the invention unduly.

EXAMPLE I

Natural gas having the composition indicated below is reformed, in a pebble heater type apparatus, to synthesis gas containing hydrogen to carbon monoxide in a mole ratio of 2:1.

*Natural gas*

| Component: | Mole per cent |
|---|---|
| Nitrogen | 7 |
| Methane | 79.4 |
| Ethane | 8.8 |
| Propane | 3.7 |
| Butanes | 0.9 |
| Pentanes and heavier | 0.2 |
| Total | 100.0 |

About 85 per cent of the natural gas to be reformed, is admixed with an amount of oxygen to provide a combustion mixture having an oxygen to natural gas mole ratio of 0.8:1. The overall oxygen to natural gas ratio is 0.7:1, which gives a mole ratio of hydrogen to carbon monoxide in the final synthesis gas product of about 1:8 to 1. Steam is added to bring the hydrogen to carbon monoxide mole ratio up to about 2:1. About 0.42 volumes of 200° F. superheated steam per volume of total natural gas to be converted, is added to the oxygen-natural gas combustion mixture and the resulting natural gas-oxygen-steam admixture passed to the combustion zone of the pebble heater apparatus, and burned at a flame temperature of 2500° F., to produce hot combustion product gas of the composition indicated below, not including the steam already added.

*Combustion product*

| Component: | Mole per cent |
|---|---|
| Hydrogen | 39.0 |
| Carbon monoxide | 30.4 |
| Carbon dioxide | 5.7 |
| Methane | 0.6 |
| Ethane and heavier hydrocarbons | 0.1 |
| Nitrogen | 1.5 |
| Steam | 22.7 |
| Total | 100.0 |

Hot combustion gas thus formed, including the added steam, is passed upwardly from the combustion chamber through the pebble mass in the pebble heating zone in direct heat exchange with refractory pebbles impregnated with nickel oxide. The rate of pebble flow through the apparatus is regulated in conjunction with the flame temperature developed in the combustion zone, to absorb heat from the hot combustion gases and to flow from the pebble heating zone into the pebble throat at a temperature of about 2000° F. Combustion gas leaves the pebble heating zone at a temperature of about 800° F. Effluent combustion gas, including the supplementary steam added, is admixed with the remaining 15 per cent of natural gas, passed to the gas reaction zone, and therein countercurrently contacted with downwardly flowing pebbles previously heated to the pebble heating chamber. The pebble mass is catalytic to the reaction and supplies the necessary sensible heat, and heat for reaction, for the carbon dioxide-steam reforming of the natural gas therein. The synthesis gas product leaves the pebble mass and reaction chamber at about the maximum 2000° F. temperature, and is thereafter quickly quenched to a temperature below 1000° F. Synthesis gas product containing hydrogen to carbon monoxide in a mole ratio of 2:1, and containing about 1.0 per cent carbon dioxide, is recovered from the quenching step. No carbon formation takes place in either the pebble heating chamber or the gas reaction chamber. Pebbles leave the lower zone at a temperature of about 700° F. and are delivered by elevating means, with substantially no heat loss, to the pebble inlet of the pebble heating chamber.

EXAMPLE II

The process of Example I is repeated in the absence of supplementary steam. In this case, the mole ratio of hydrogen to carbon monoxide in the final synthesis gas product is 1.8:1 and the flame temperature developed, is about 3000° F. However, by regulating pebble flow, temperature of the pebbles entering the pebble heater throat may be as low as 2700–2800° F.

EXAMPLE III

The process of Example I is repeated except that air is substituted for oxygen in an amount to provide the over all oxygen to natural gas ratio employed in Example I. In this case, instead of 0.42 volumes of 200° F. superheated steam, it is necessary to add about 0.7 volumes of 200° F. superheated steam per total volume of natural gas in order to obtain the desired 2:1 mole ratio of hydrogen to carbon monoxide in the synthesis gas product.

I claim:

1. A continuous process for the manufacture of carbon monoxide and hydrogen from natural gas, comprising continuously gravitating a contiguous mass of pebbles through a series of zones comprising a pebble heating zone, a reaction zone positioned below said pebble heating zone, and a relatively narrow interconnecting zone, each said zone being substantially filled with said contiguous mass of pebbles; introducing a portion of said natural gas to be converted, together with oxygen in a volume ratio of oxygen to natural gas within the limits of 0.8:1 and 0.9:1, into said pebble heating zone, the remaining portion of said natural gas utilized as described hereafter; burning natural gas with oxygen in said pebble heating zone, each having been introduced thereinto as already described, whereby the resulting flame is formed at a temperature above a predetermined temperature level required for steam-carbon dioxide reforming of natural gas as described hereafter and products of combustion comprise carbon monoxide, oxygen, steam, and carbon dioxide; continuously contacting that section of said contiguous pebble mass gravitating through said pebble heating zone with combustion gas resulting from said burning to heat said pebbles therein to a temperature substantially above said predetermined temperature level; withdrawing total combustion gas from said heating zone and admixing same with said remaining portion of natural gas and passing the resulting admixture at a flow rate through that section of said pebble mass flowing through said reaction zone regulated to insure heating said admixture to said predetermined temperature level, whereby steam, natural gas and carbon dioxide in said reaction zone interreact to form carbon monoxide and hydrogen; and withdrawing carbon monoxide and hydrogen from said reaction zone as a product of the process.

2. The process of claim 1 wherein said pebbles are impregnated with a material catalytic to said reforming, and wherein steam is introduced into said pebble heating zone together with said natural gas and oxygen introduced thereinto in a quantity so as to regulate said flame temperature thereby providing pebbles heated to a temperature conducive to the catalytic reforming taking place in said reaction zone.

3. The process of claim 1 wherein the quantity of said steam, as measured at 200° F., is within the range of 0.2 to 0.5 volumes per total volume of natural gas converted and wherein liquid water is introduced into said pebble heating zone together with said steam.

4. A process for the manufacture of carbon monoxide and hydrogen from natural gas, comprising burning incompletely a portion of the said natural gas with oxygen in an oxygen to natural gas volume ratio to produce combustion gas comprising carbon dioxide, steam, and substantial quantities of hydrogen and carbon monoxide at a temperature above 1400° F. and not exceeding 255° F.; passing combustion gas thus formed in direct heat exchange relation with a first section of a moving contiguous pebble mass so as to heat said pebbles in contact therewith to a temperature above 1400° F. and not exceeding 2500° F.; withdrawing combustion gas from the zone of said direct heat exchange and passing same together with the remaining portion of said natural gas in contact with a second section of said contiguous mass previously heated in the zone of said heat exchange, to heat said combustion gas-natural gas admixture contacted therewith to a temperature of at least 1400° F. and not exceeding 2500° F., whereby natural gas reacts with carbon dioxide and steam to form synthesis gas; the over-all volume ratio of total oxygen to total natural gas introduced into contact with said contiguous pebble mass being within limits of 0.6:1 to 0.9:1; and recovering synthesis gas from the effluents from the zone of the last said reaction, as a product of the process.

5. The process of claim 4 wherein said combustion gas is produced at a temperature not exceeding 2200° F., wherein said pebbles are impregnated with a nickel catalyst material and wherein said synthesis gas is formed at a temperature in the range of 1400°–2000° F.

6. The process of claim 4 wherein said pebbles are catalytic to the said formation of synthesis gas.

7. A continuous catalytic process for the manufacture from natural gas containing at least 80 per cent methane, a carbon monoxide-hydrogen feed stock suitable for use in the synthesis of hydrocarbons and oxygen derivatives of hydrocarbons, comprising continuously flowing by gravity a contiguous mass of ¼" to 1" spherical pebbles impregnated with a nickel catalyst through a series of substantially vertically extending zones comprising a pebble heating zone, a reaction zone positioned at a lower level than said heating zone, and a relatively narrow interconnecting zone, each said zone being substantially filled with said contiguous mass of pebbles and permitting relatively unrestricted flow of pebbles therethrough, introducing oxygen and from 75 to 90 percent of said natural gas in admixture to a combustion zone subjacent said heating zone in an oxygen to natural gas volume ratio within the limits of 0.8:1 to 0.9:1, the remaining portion of said natural gas utilized as hereafter described, in said combustion zone burning said natural gas-oxygen mixture to produce combustion gas comprising carbon dioxide, hydrogen, steam and carbon monoxide, at a temperature in the range of 2200–2500° F., continuously contacting that section of said contiguous mass of pebbles flowing through said heating zone with said hot combustion gas at a flow rate regulated to insure heating said pebbles to a temperature not higher than 2200° F., withdrawing said combustion gas from the upper portion of said heating zone and admixing same with said remaining portion of natural gas, passing the resulting natural gas-combustion gas admixture through that section of said contiguous mass of pebbles flowing through said reaction zone at a flow rate regulated to insure heating said admixture to a temperature in the range of 1800 to 2200° F. whereby carbon monoxide-hydrogen product is formed, withdrawing said product from said reaction zone at a temperature not less than 1800° F., continuously removing pebbles from the lower portion of said reaction zone, quickly quenching effluent from said reaction zone to a temperature below 1000° F., and recovering effluent carbon monoxide-hydrogen product from said reaction zone.

8. The process of claim 7 wherein steam is introduced to said combustion zone in amount within the limits of 0.2 to 0.5 volumes per total volume of natural gas reacted in said heating zone and in said reaction zone.

References Cited in the file of this patent

UNITED STATES PATENTS

| Number | Name | Date |
|---|---|---|
| 1,957,743 | Wietzel et al. | May 8, 1934 |
| 2,051,363 | Beekley | Aug. 18, 1936 |
| 2,324,172 | Parkhurst | July 13, 1943 |
| 2,381,696 | Shapleigh | Aug. 7, 1945 |
| 2,432,872 | Ferro, Jr. | Dec. 16, 1947 |
| 2,448,290 | Atwell | Aug. 31, 1948 |
| 2,493,454 | Hagy | Jan. 3, 1950 |
| 2,523,284 | Eastman | Sept. 26, 1950 |

OTHER REFERENCES

"Fuel Flue Gases," published by American Gas Association, 1940, page 159.